United States Patent
Zhou (10) Patent No.: US 7,616,157 B2
(45) Date of Patent: Nov. 10, 2009

(54) SYSTEM AND METHOD FOR EFFECTIVELY PERFORMING ENHANCED MOBILE-DEVICE LOCATION PROCEDURES

(75) Inventor: Yi Zhou, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 11/731,588

(22) Filed: Mar. 30, 2007

(65) Prior Publication Data

US 2008/0238767 A1 Oct. 2, 2008

(51) Int. Cl.
*G01S 3/02* (2006.01)
(52) U.S. Cl. .................. 342/464; 342/457; 342/463
(58) Field of Classification Search .......... 342/450, 342/457, 463, 464; 455/456.3, 456.5, 456.6
See application file for complete search history.

(56) References Cited

U.S. PATENT DOCUMENTS

2002/0055817 A1  5/2002  Chou

2007/0010248 A1  1/2007  Dravida et al.

FOREIGN PATENT DOCUMENTS

| JP | 2005351823 A2 | 12/2005 |
|---|---|---|
| WO | WO/00/63646 A1 | 10/2000 |
| WO | WO2005106523 A1 | 11/2005 |

*Primary Examiner*—Dao L Phan
(74) *Attorney, Agent, or Firm*—Gregory J. Koerner; Redwood Patent Law (57) ABSTRACT

A system and method for effectively performing enhanced device location procedures to determine the current physical location of a mobile device includes a plurality of satellites that wirelessly transmit satellite beacon signals, a plurality of base stations that wirelessly transmit pilot signals, and a plurality of access points that wirelessly transmit access-point beacon signals. A location detector of the mobile device coordinates a device location procedure by measuring the satellite beacon signals, the pilot signals, and the access-point beacon signals to generate corresponding satellite information, base station information, and access point information. The location detector analyzes the satellite information, the base station information, and the access point information to select an optimal system configuration from the most effective satellites, base stations, and access points. The location detector then utilizes the optimal system configuration to accurately calculate the current physical location of the mobile device.

11 Claims, 9 Drawing Sheets

System Configuration Table

Configuration 1:

Satellites Only — 518(a)

Configuration 2:

Satellite(s) and Base Station(s) — 518(b)

Configuration 3:

Base Station(s) and Access Point(s) — 518(c)

Configuration 4:

Access Points Only — 518(d)

Configuration 5:

Satellite(s), Base Station(s), and Access Point(s) — 518(e)

SYSTEM AND METHOD FOR EFFECTIVELY PERFORMING ENHANCED MOBILE-DEVICE LOCATION PROCEDURES

BACKGROUND SECTION

1. Field of the Invention

This invention relates generally to techniques for utilizing mobile electronic devices, and relates more particularly to a system and method for effectively performing enhanced mobile-device location procedures.

2. Description of the Background Art

Implementing effective methods for utilizing mobile electronic devices is a significant consideration for designers and manufacturers of contemporary electronic devices. However, effectively implementing mobile devices may create substantial challenges for system designers. For example, enhanced demands for increased system functionality and performance may require more device processing power and require additional device resources. An increase in processing or device requirements may also result in a corresponding detrimental economic impact due to increased production costs and operational inefficiencies.

Furthermore, enhanced device capability to perform various advanced operations may provide additional benefits to a device user, but may also place increased demands on the control and management of various device components. For example, implementing an enhanced electronic device that effectively provides accurate device-location information to a device user may present certain difficulties because of the unpredictable differences in physical locations and operating environments that may potentially be encountered.

Due to growing demands on system resources and the significant difficulty in predicting the varying device operating conditions and environments, it is apparent that developing new techniques for implementing and utilizing mobile electronic devices is a matter of concern for related electronic technologies. Therefore, for all the foregoing reasons, developing effective systems for implementing and utilizing mobile electronic devices remains a significant consideration for designers, manufacturers, and users of contemporary electronic devices.

SUMMARY

In accordance with the present invention, a system and method are disclosed for effectively performing enhanced mobile-device location procedures. In accordance with one embodiment of the present invention, an electronic system is configured to include at least one mobile device, a plurality of satellites, a plurality of base stations, a location server, and a plurality of access points. The satellites may be implemented as part of a global-positioning system to transmit satellite beacon signals, such as Coarse Acquisition (C/A) signals. The base stations may be implemented as terrestrial wireless wide-area network devices that transmit pilot signals and receive GPS assistance data. The access points may be implemented as wireless local-area network devices to transmit access-point beacon signals, such as PHY Convergence Layer Procedure (PLCP) Preamble.

In one embodiment, the mobile device is initially powered-up, and a satellite reception feature is activated. In addition, the wireless wide-area network (WWAN) functionality of the mobile device is also activated. A satellite module of the mobile device then searches for any available satellite beacon signals to identify currently-available satellites in the electronic network. The satellite module measures each received satellite beacon signal for predefined signal characteristics that may include, but are not limited to, signal strength and signal quality. The satellite module may also determine which of the known satellites are not currently available for any reason.

The satellite module locally stores all measured data and statistics from the available satellites as satellite information. A location detector of the mobile device determines whether a remote location server will be used to perform certain calculations and analyses during the current mobile-device location procedure. If the location server will be utilized during the current mobile-device location procedure, then the mobile device transmits the measured satellite information to the location server by utilizing any effective means. For example, the mobile device may wirelessly transmit the satellite information to the location server through one of the base stations.

In the present embodiment, a base station module of the mobile device may similarly search for any available base-station pilot signals to identify currently-available base stations in the electronic network. The base station module measures each received base-station beacon signal for predefined signal characteristics that may include, but are not limited to, signal strength and signal quality. The base station module may also determine which of the known base stations are not currently available for any reason. The base station module locally stores all measured data and statistics from the available base stations as base station information. If the location server will be utilized during the current mobile-device location procedure, then the mobile device transmits the measured base station information to the location server by utilizing any effective means.

Next, the location detector, or any other appropriate entity (such as the location server), analyzes the satellite information and the base station information. In particular, the location detector or the location server may analyze satellite information to determine how many satellites are currently providing valid satellite beacon signals to the mobile device. The location detector or the location server then determines whether there are currently a sufficient number of available satellites to successfully perform an accurate mobile-device location procedure. In certain embodiments, the location detector may compare the total number of currently-available satellites with a predefined minimum satellite threshold value.

If there are currently a sufficient number of available satellites to successfully perform an accurate mobile-device location procedure, then the location detector or the location server may evaluate satellite information and base station information to ensure that a system configuration for successfully performing the current mobile-device location procedure may be formed by utilizing only satellite(s) and base station(s). If signal characteristics (signal strength, signal quality, etc.) of satellite information and base station information are inadequate, then the mobile device activates its wireless local-area network (WLAN) functionality.

An access point module of the mobile device then searches for any available access-point beacon signals to identify currently-available access points in the electronic network and achieve the time synchronization, thus the distance(s) to the access point(s). The access point module measures each received access-point beacon signal for predefined signal characteristics that may include, but are not limited to, signal strength and signal quality. The access-point module may also determine which of the known access points are not currently available for any reason. The access point module locally stores all measured data and statistics from the available access points as access point information. If the location server will be utilized during the current mobile-device location procedure, then the mobile device transmits the measured access point information to the location server by utilizing any effective means.

Next, the location detector or another appropriate entity (such as location server) utilizes certain predefined selection criteria for performing a system-configuration analysis procedure on all stored information (satellite information, base station information, and access point information) to determine an optimal system configuration for performing the current mobile-device location procedure. In certain embodiments, the available system configurations include, but are not limited to, a first configuration with only satellites, a second configuration with any effective combination of satellite(s) and base station(s), a third configuration with any effective combination of base station(s) and access point(s), and a fourth configuration with only access points. Finally, the location detector may utilize the selected optimal system configuration for accurately determining the current physical location of the mobile device. For at least the foregoing reasons, the present invention therefore provides an improved system and method for effectively performing enhanced mobile-device location procedures

DETAILED DESCRIPTION

The present invention relates to an improvement in the effective utilization of mobile electronic devices. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing enhanced device location procedures to determine the current physical location of a mobile device, and includes a plurality of satellites that wirelessly transmit satellite beacon signals, a plurality of base stations that wirelessly transmit pilot signals, and a plurality of access points that wirelessly transmit access-point beacon signals. A location detector of the mobile device coordinates a device location procedure by measuring the satellite beacon signals, the pilot signals, and the access-point beacon signals to generate corresponding satellite information, base station information, and access point information. The location detector analyzes the satellite information, the base station information, and the access point information to select an optimal system configuration from the most effective satellites, base stations, and access points. The location detector then utilizes the optimal system configuration to accurately calculate the current physical location of the mobile device.

Figure 1:
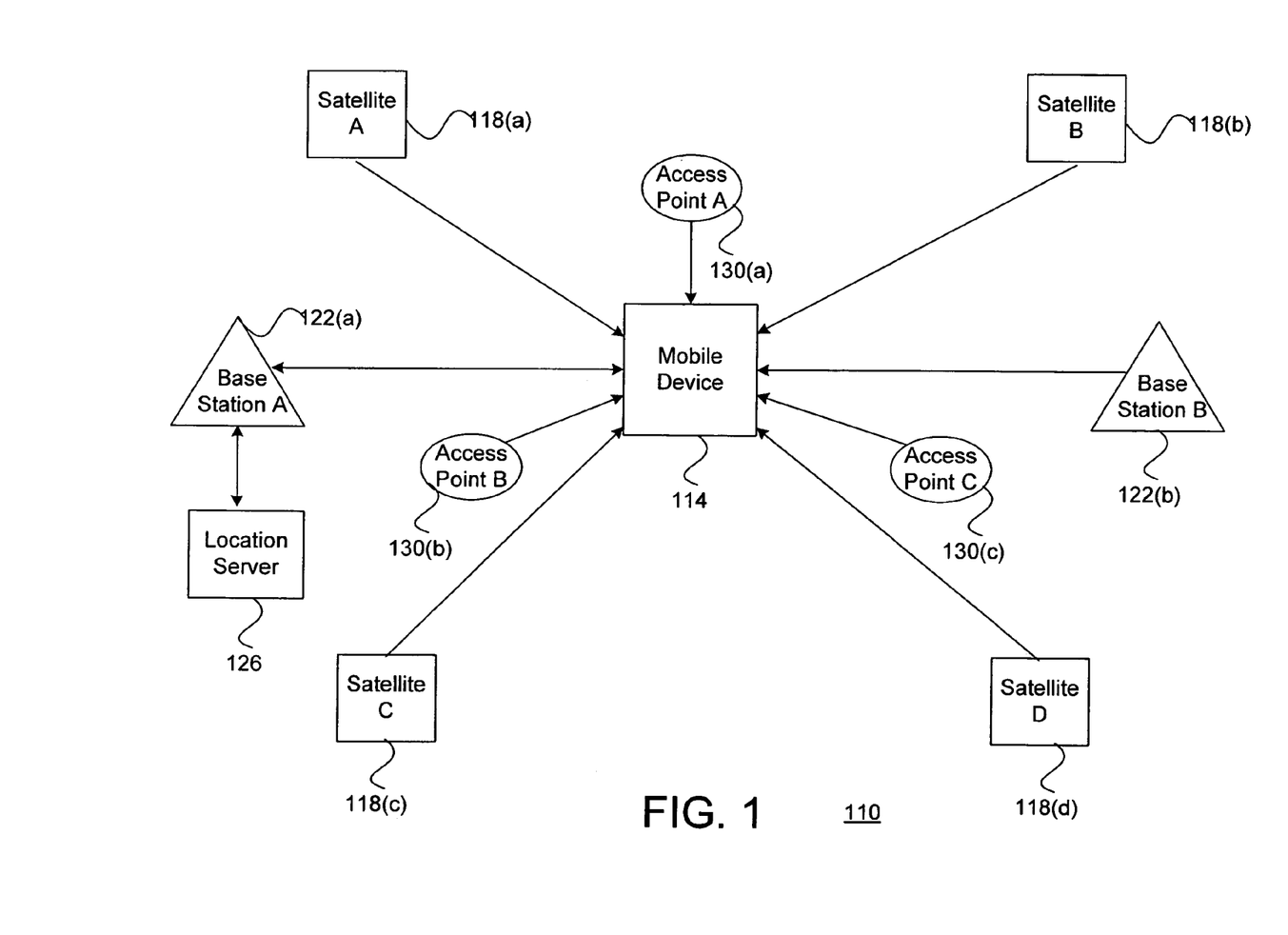
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may include, but is not limited to, at least one mobile device 114, a plurality of satellites 118, a plurality of base stations 122, a location server 126, and a plurality of access points 130. In alternate embodiments, electronic system 110 may be implemented using various components and configurations in addition to, or instead of, those components and configurations discussed in conjunction with the FIG. 1 embodiment.

For purposes of illustration, the FIG. 1 embodiment is implemented with one mobile device 114, four satellites 118, two base stations 122, one location server 126, and three access points 130. However, in various other embodiments, electronic network 110 may be implemented to include any desired number (including zero) of the mobile devices 114, satellites 118, base stations 122, location servers 126, and access points 130 In the FIG. 1 embodiment, mobile device 114 may be implemented as any type of electronic device for which a current physical location may advantageously be determined and conveyed to a device user or other appropriate entity. For example, in certain embodiments, mobile device 114 may include, but is not limited to, a laptop computer device, a personal digital assistant (PDA), a cellular telephone, or a global positioning system (GPS) device in an automobile or elsewhere. Additional details regarding the implementation and utilization of mobile device 114 are further discussed below in conjunction with FIGS. 3-6.

In the FIG. 1 embodiment, satellites 130 include, but are not limited to, a satellite A 118(*a*), a satellite B 118(*b*), a satellite C 118(*c*), and a satellite D 118(*d*) that are implemented by utilizing any appropriate technologies to perform any desired functions or operations. For example, in certain embodiments, satellites 118 may be implemented as part of a known or enhanced global positioning system (GPS). In the FIG. 1 embodiment, satellites 118 typically transmit respective satellite beacon signals that mobile device 114 may receive and analyze using known location calculation procedures (such as trilateralization and/or triangulation) to potentially determine a current physical location (such as longitude, latitude, and altitude information) for mobile device 114.

However, in certain situations, mobile device 114 may be unable to receive satellite beacon signals from a sufficient number of the satellites 130 to successfully perform the location calculation procedures. For example, mobile device 114 may be inside a building or other structure that prevents some or all of the satellite beacon signals from reaching mobile device 114. Or one or more of the satellite beacon signals may have insufficient signal quality characteristics. To provide additional signal sources from locations other than satellites 130, the FIG. 1 embodiment may include a base station A 122(*a*) and a base station B 122(*b*) that are both implemented as terrestrial devices that transmit pilot signals that may be received by mobile device 114. As with the foregoing satellite beacon signals, mobile device 114 may analyze the pilot signals from base stations 122 using similar location calculation procedures potentially determine the current physical location of mobile device 114.

In the FIG. 1 embodiment, base stations 122 may be implemented by utilizing any appropriate technologies to perform any desired functions or operations. For example, in certain embodiments, base stations 122 may be implemented as part of a known or enhanced wireless wide-area network (WWAN) system by utilizing any appropriate technologies. Furthermore, in certain embodiments, satellites 118 and base stations 122 may be implemented as part of a known or enhanced assisted global-positioning system (AGPS) network. In certain embodiments, base stations 122 may transmit pilot signals at transmission frequencies that include, but are not limited to, 0.8 gigahertz or 1.9 gigahertz. In certain embodiments, electronic network 110 may also include an optional location server 126 that mobile device 114 utilizes to perform various types of calculations or processing functions to thereby conserve processing resources for mobile device 114.

However, in certain operating environments, mobile device 114 may still be unable to receive a satisfactory combination of satellite beacon signals from the satellites 130 and pilot signals from the base stations 122 to successfully perform the location calculation procedures to accurately locate mobile device 114. For example, mobile device 114 may be inside a concrete parking structure or a shopping mall that prevents some or all of the satellite beacon signals and pilot signals from reaching mobile device 114. Or one or more of the satellite beacon signals or base station pilot signals may have insufficient signal quality characteristics (signal strength, signal-to-noise ratios, etc.).

In accordance with the present invention, in order to provide additional beacon signals from signal sources other than satellites 130 and base stations 122, the FIG. 1 embodiment advantageously includes access points 130 that are implemented as terrestrial devices that transmit access-point beacon signals to mobile device 114. As with the previously-discussed satellite beacon signals and pilot signals, mobile device 114 may also analyze the access-point beacon signals using similar location calculation procedures to more accurately and effectively determine the current physical location of mobile device 114.

In the FIG. 1 embodiment, access points 130 include, but are not limited to, an access point A 130(a), an access point B 130(b), and an access point C 130(c) that may be implemented by utilizing any appropriate technologies to perform any desired functions or operations. For example, in certain embodiments, access points 130 may be implemented as part of a known or enhanced wireless local-area network (WLAN) system using any appropriate technologies. In certain embodiments, access points 130 may be implemented according to WLAN standards that include, but are not limited to, any of the known 802.11 WLAN standards (such as 802.11a. 802.11b, 802.11g, and 802.11n). In addition, access points 130 may transmit access-point beacon signals at transmission frequencies that include, but are not limited to, 2.4 gigahertz or 5.0 gigahertz.

In certain embodiments in which access points 130 are implemented as publicly-deployed WiFi "hotspots" or other similar WLAN nodes/systems, the widespread presence of such WLAN networks provides a ready availability of pre-existing potential access points 130 at many public locations. Additional details regarding the implementation and utilization of mobile device 114 and access points 130 in electronic system 110 are further discussed below in conjunction with FIGS. 2 and 5-6.

Figure 2:
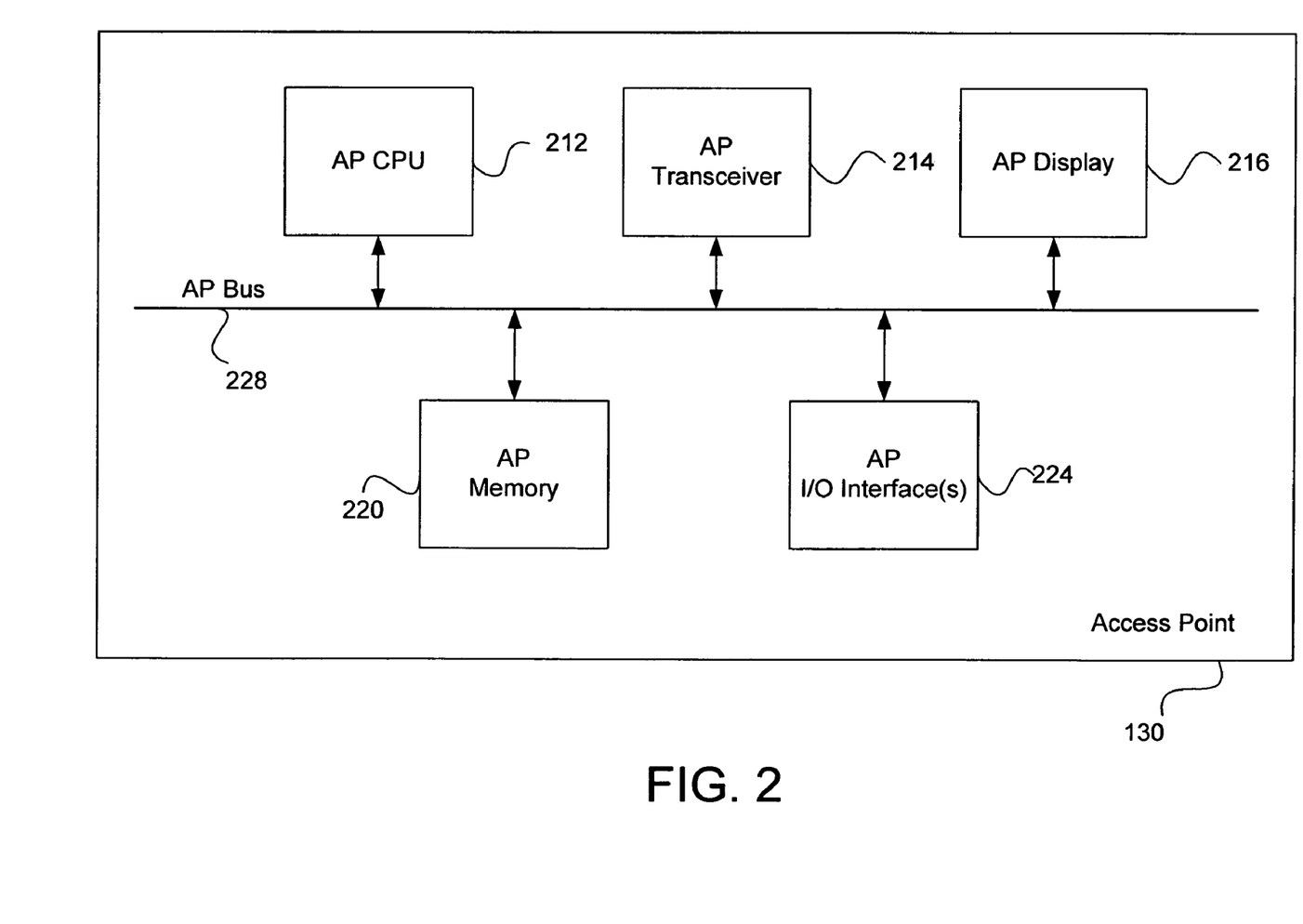
FIG. 2 is a block diagram for one embodiment of an access point of FIG. 1, in accordance with the present invention.

Referring now to FIG. 2, a block diagram for one embodiment of a FIG. 1 access point 130 is shown, in accordance with the present invention. In the FIG. 2 embodiment, access point 130 may include, but is not limited to, an AP central processing unit (CPU) 212, an AP transceiver 214, an AP display 216, an AP memory 220, and one or more AP input/output interfaces (I/O interfaces) 224. Selected ones of the foregoing components of access point 130 may be coupled to, and communicate through, an AP bus 228. In alternate embodiments, access point 130 may be implemented using various components and configurations in addition to, or instead of, certain of components and configurations discussed in conjunction with the FIG. 2 embodiment.

In the FIG. 2 embodiment, AP CPU 212 may be implemented to include any appropriate and compatible microprocessor device that preferably executes software instructions to thereby control and manage the operation of access point 130. In the FIG. 2 embodiment, AP memory 220 may be implemented to include any combination of desired storage devices, including, but not limited to, read-only memory (ROM), random-access memory (RAM), and various types of non-volatile memory, such as floppy disks, flash memory, or hard disks. In the FIG. 2 embodiment, AP I/O interfaces 224 may preferably include one or more input and/or output interfaces to receive and/or transmit any required types of information for access point 130. For example, in the FIG. 2 embodiment, access point 130 may utilize AP I/O interfaces 224 to bi-directionally communicate with any desired type of external entities to receive or send electronic information by utilizing any appropriate and effective techniques.

In the FIG. 2 embodiment, access point 130 may utilize AP display 216 for displaying any desired type of information by utilizing any effective type of display technologies. In the FIG. 2 embodiment, AP transceiver 214 may include any appropriate means for bi-directionally transferring (transmitting and/or receiving) electronic information between access point 130 and other devices by utilizing wireless communication techniques. For example, access point 130 may utilize AP transceiver 214 to transmit any desired type of access-point beacon signals to mobile device 114, as discussed above in conjunction with FIG. 1.

In the FIG. 2 embodiment, AP transceiver 214 may generate certain types of enhanced access-point beacon signals that include an enhanced acquisition code that mobile device 114 may then analyze to identify a particular access point 130, and to evaluate signal quality characteristics for that particular access point 130. In certain embodiments, the enhanced acquisition code may include, but is not limited to, a pseudo-random number that has optimal cross-correlation features. In certain embodiments, the enhanced acquisition code may be similar to certain coarse/acquisition codes or "gold codes" that are sometimes utilized by satellites 118 as part of their satellite beacon signals. Additional details regarding the implementation and utilization of access point 130 are further discussed below in conjunction with FIGS. 6A-6D.

Figure 3:
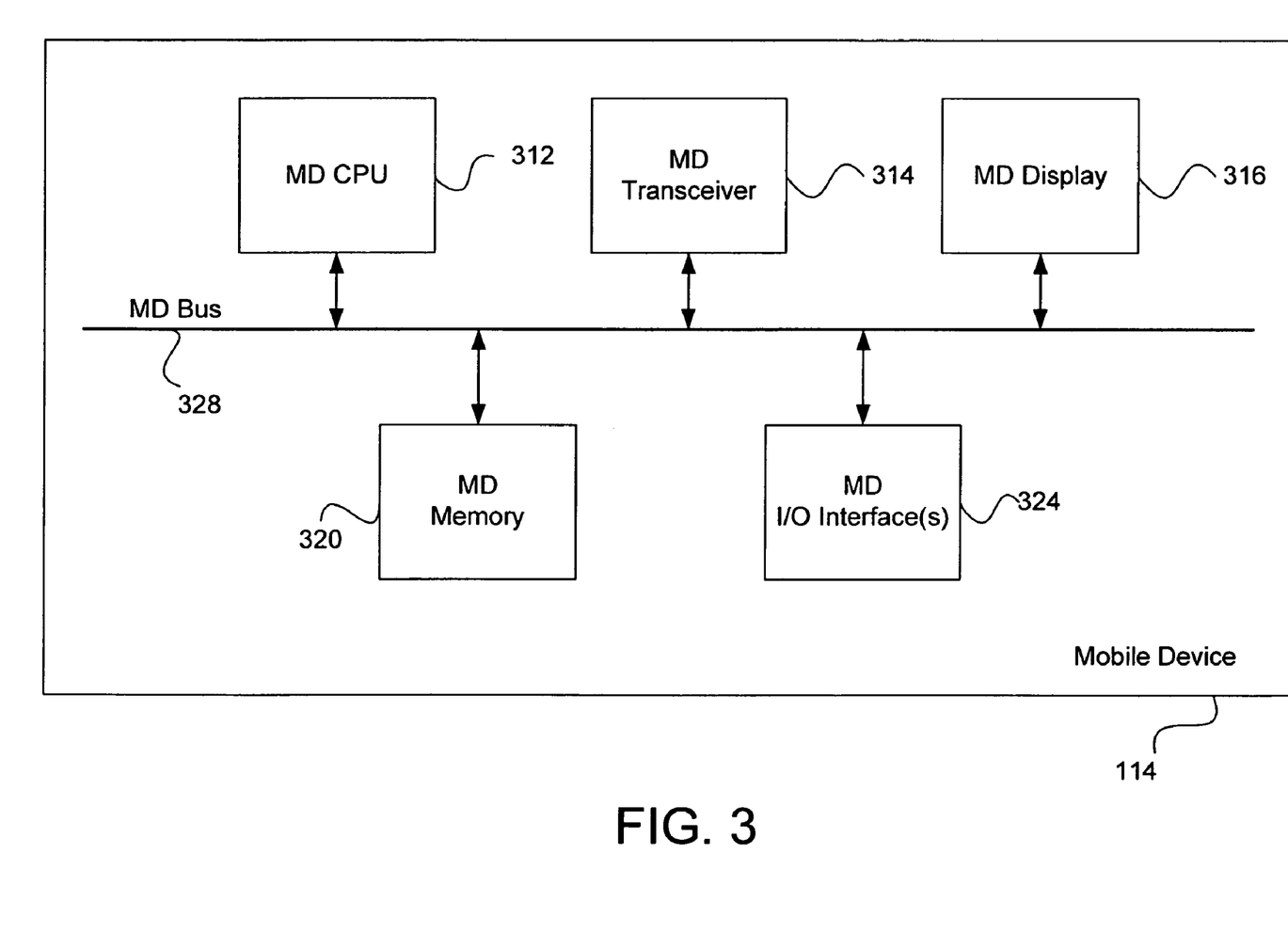
FIG. 3 is a block diagram for one embodiment of the mobile device of FIG. 1, in accordance with the present invention.

Referring now to FIG. 3, a block diagram for one embodiment of the FIG. 1 mobile device 114 is shown, in accordance with the present invention. In the FIG. 3 embodiment, mobile device 114 may include, but is not limited to, an MD central processing unit (CPU) 312, an MD transceiver 314, an MD display 316, an MD memory 320, and one or more MD input/output interfaces (I/O interfaces) 324. Selected ones of the foregoing components of mobile device 114 may be coupled to, and communicate through, an MD bus 328. In alternate embodiments, mobile device 114 may be implemented using components and configurations in addition to, or instead of, certain of those components and configurations discussed in conjunction with the FIG. 3 embodiment.

In the FIG. 3 embodiment, MD CPU 312 may be implemented to include any appropriate and compatible microprocessor device that preferably executes software instructions to thereby control and manage the operation of mobile device 114. In the FIG. 3 embodiment, MD memory 320 may be implemented to include any combination of desired storage devices, including, but not limited to, read-only memory (ROM), random-access memory (RAM), and various types of non-volatile memory, such as floppy disks, flash memory, or hard disks. Additional details regarding the implementation and utilization of MD memory 320 are further discussed below in conjunction with FIG. 4.

In the FIG. 3 embodiment, MD I/O interfaces 324 may preferably include one or more input and/or output interfaces to receive and/or transmit any required types of information for mobile device 114. For example, in the FIG. 3 embodiment, mobile device 114 may utilize MD I/O interfaces 324 to bi-directionally communicate with any desired type of external entities to receive or send electronic information by utilizing any appropriate and effective techniques. In the FIG. 3 embodiment, mobile device 114 may utilize MD display 316 for displaying any desired type of information by utilizing any effective type of display technologies.

In the FIG. 3 embodiment, MD transceiver 314 may include any appropriate means for bi-directionally transferring (transmitting and/or receiving) electronic information between mobile device 114 and other devices by utilizing wireless communication techniques. In certain embodiments, MD transceiver 314 may include, but is not limited to, a satellite transceiver for communicating with satellites 118, a base station transceiver for communicating with base stations 126, and an access-point transceiver for communicating with access points 130. Additional details regarding the implementation and utilization of mobile device 114 are further discussed below in conjunction with FIGS. 4-6.

Figure 4:
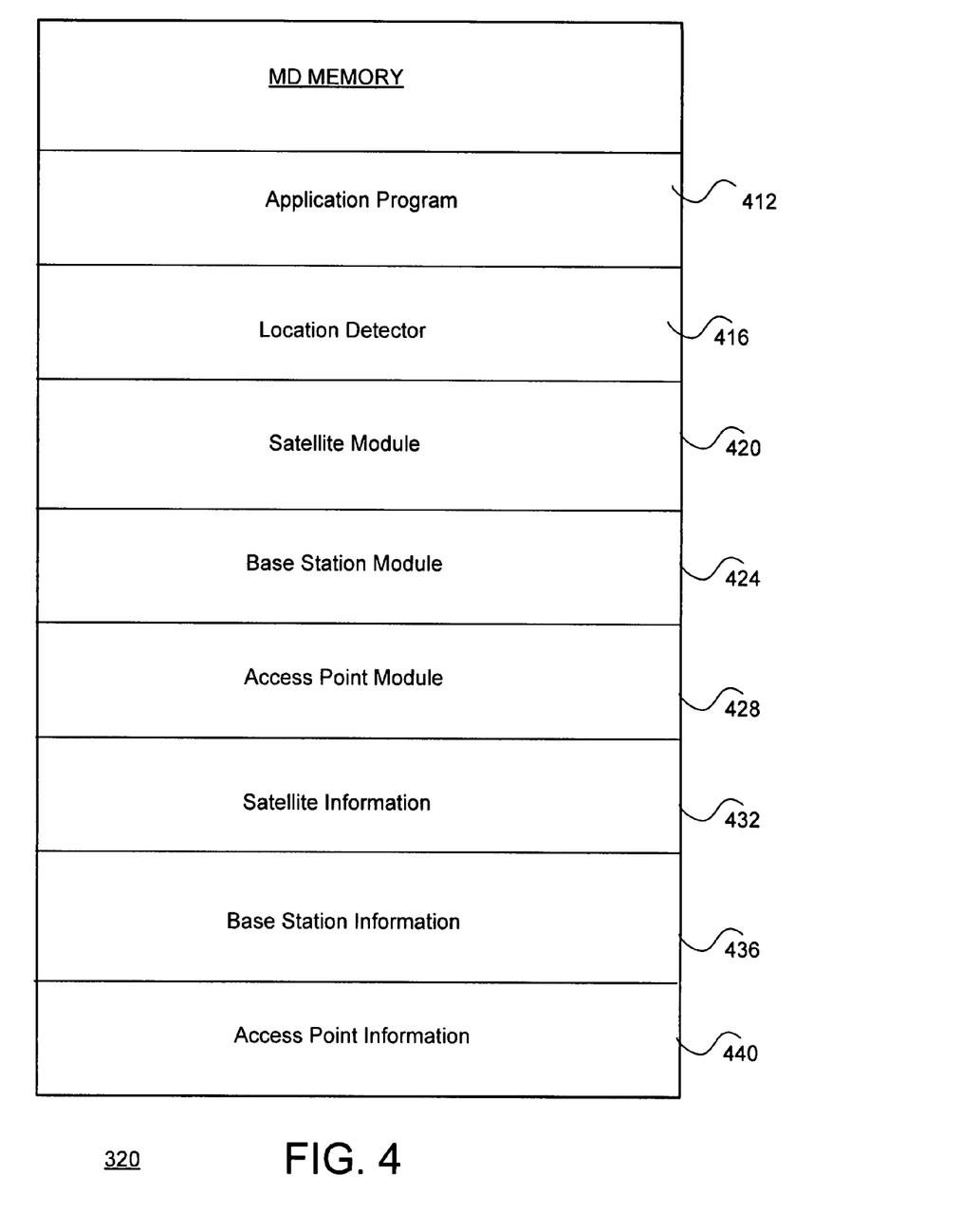
FIG. 4 is a block diagram for one embodiment of the MD memory of FIG. 3, in accordance with the present invention.

Referring now to FIG. 4, a block diagram for one embodiment of the FIG. 3 MD memory 320 is shown, in accordance with the present invention. In the FIG. 4 embodiment, MD memory 320 includes, but is not limited to, an application program 412, a location detector 416, a satellite module 420, a base station module 424, an access point module 428, satellite information 432, base station information 436, and access point information 440. In alternate embodiments, MD memory 320 may include components and functionalities in addition to, or instead of, certain of those components and functionalities discussed in conjunction with the FIG. 4 embodiment.

In the FIG. 4 embodiment, application program 412 may include program instructions that are preferably executed by MD CPU 312 (FIG. 3) to perform various functions and operations for mobile device 114. The particular nature and functionality of application program 412 typically varies depending upon factors such as the specific type and particular functionality of the corresponding mobile device 114.

In the FIG. 4 embodiment, location detector 412 may be utilized to coordinate and manage enhanced mobile-device location procedures to determine a current physical location of mobile device 114 by utilizing any effective techniques. In certain embodiments, location server 126 (FIG. 1) may also have a software module similar to location detector 412 to remotely perform certain required processing functions. Additional details for utilizing location detector 416 are further discussed in conjunction with FIGS. 1 and 5-6. In the FIG. 4 embodiment, satellite module 424 may be utilized to manage communications with satellites 118 (FIG. 1). Similarly, base station module 424 may be utilized to manage communications with base stations 122 (FIG. 1), and access point module 428 may be utilized to manage communications with access points 130 (FIG. 1).

In the FIG. 4 embodiment, satellite information 432, base station information 436, and access point information 440 may include any types of measurements, data, or other information relating to respective ones of the satellites 118, base stations 122, and access points 130 (FIG. 1). Examples of such information include, but are not limited to, presence/availability of satellite beacon signals, pilot signals, or access-point beacon signals, signal strengths, signal-to-noise values, signal quality characteristics, signal delays, etc.

In the FIG. 4 embodiment, the location detector 416 and the various modules 420, 424, and 428 are disclosed and discussed as being implemented as software. However, in alternate embodiments, some or all of these functions may be performed by appropriate electronic hardware circuits that are configured for performing various functions that are equivalent to those functions of the software modules discussed herein. The implementation and utilization of location detector 416 are further discussed below in conjunction with FIGS. 5-6.

Figure 5:
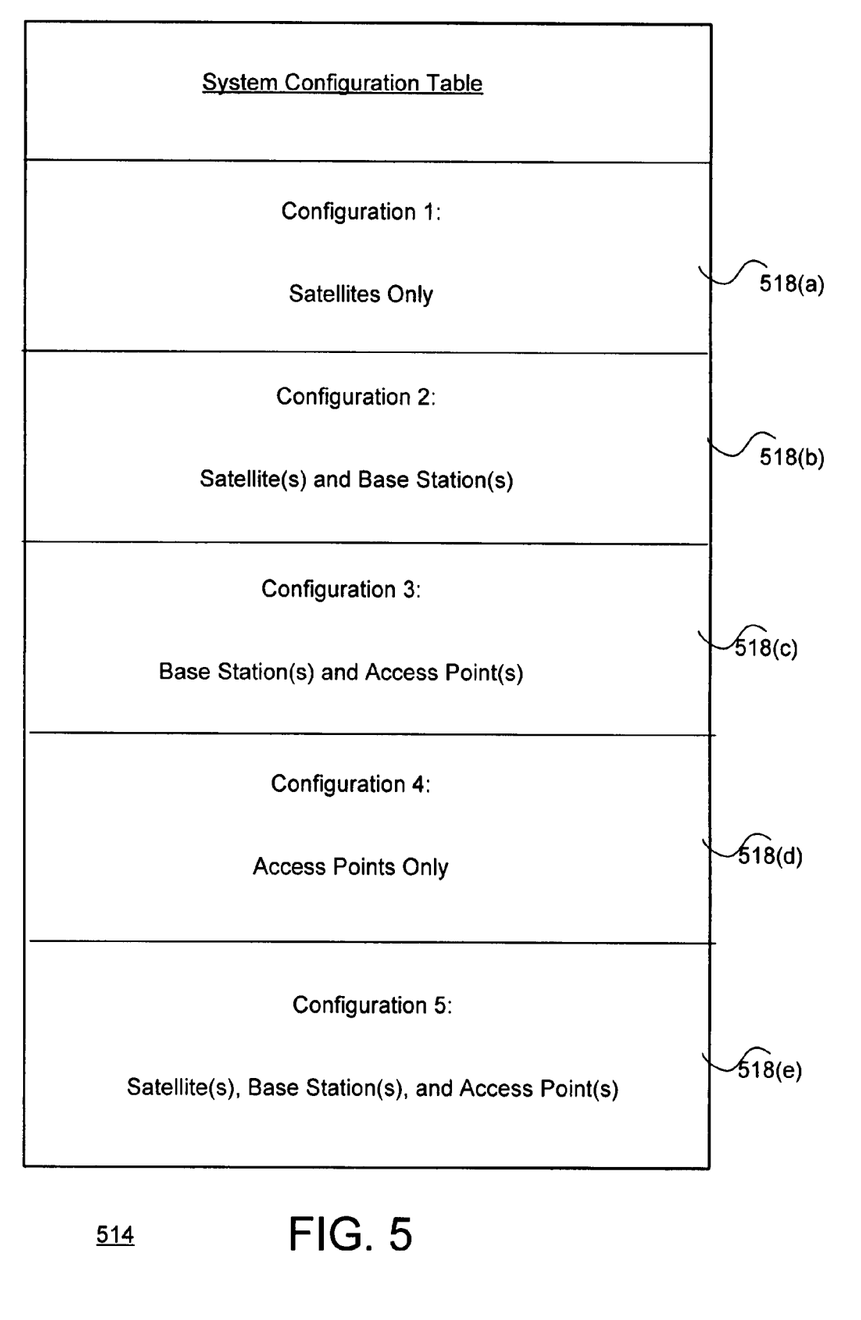
FIG. 5 is one embodiment for a system configuration table, in accordance with the present invention.

Referring now to FIG. 5, a system configuration table 514 is shown, in accordance with one embodiment of the present invention. In the FIG. 5 embodiment, configurations 1-4 (518 (a-d)) are shown. In alternate embodiments, the present invention may be practiced using components and configurations in addition to, or instead of, certain of those components and configurations discussed in conjunction with the FIG. 5 embodiment.

In the FIG. 5 embodiment, location detector 416 may select one of the system configurations 518 from system configuration table 514 to perform mobile-device location procedures depending upon certain pre-determined selection rules and selection criteria. In the FIG. 5 embodiment, the system configurations 518 include a configuration 1 (518(a)) in which the mobile-device location procedures are performed with only satellites 118, and a configuration 2 (518(b)) in which the mobile-device location procedures are performed with any effective combination of satellite(s) 118 and base station(s) 122.

In addition, the FIG. 5 system configurations 518 include a configuration 3 (518(c)) in which the mobile-device location procedures are performed with any effective combination of base station(s) 122 and access point(s) 130, a configuration 4 (518(d)) in which the mobile-device location procedures are performed with only access points 130, and a configuration 5 (518(d)) in which the mobile-device location procedures are performed with any effective combination of satellite(s) 118, base station(s) 122, and access point(s) 130. In certain other embodiments, any other desired combination of satellites 118, base stations 122, and access points 130 may be utilized. For example, in certain embodiments, addition system configurations 518 may include, but are not limited to, a configuration 6 with any effective combination of satellite(s) 118 and access point(s) 130.

In accordance with the present invention, location detector 416 (FIG. 4) or other appropriate entity (such as location server 126 of FIG. 1) may perform a system-configuration analysis procedure for electronic system 110 to optimally select one or more of the system configurations 518 for performing corresponding enhanced mobile-device location procedures. In the FIG. 5 embodiment, location detector 416 may select a system configuration 518 based upon certain predefined selection rules and selection criteria that may be defined to include any effective and appropriate information.

For example, the system configurations 518 may each be assigned a respective priority value. The location detector 416 may evaluate which system configurations 518 currently have available signal sources under current operating conditions, and may then select the available configuration 518 with the highest priority value. The foregoing priority values may be assigned based upon any desired design considerations, including, but not limited to, total configuration power consumption of the various system configurations 518.

In certain embodiments, an optimal system configuration 518 may be selected to ensure the most accurate performance of the corresponding mobile-device location procedures. For example, location detector 416 may evaluate signal characteristics of the different system configurations 518, and then select the system configuration 518 with the best evaluation score. The evaluated signal characteristics may include any desired characteristics of the satellite beacon signals, the base-station pilot signals, and the access-point beacons signals, including, but not limited to, signal strength and signal quality. In certain embodiments, the foregoing signal characteristics may be modified with corresponding respective weighting values before combining into the final evaluation scores. Additional details for utilizing system configurations 518 are further discussed below in conjunction with FIGS. 6A-6D.

Referring now to FIGS. 6A-6D, a flowchart of method steps for effectively performing an enhanced mobile-device location procedure is shown, in accordance with one embodiment of the present invention. The example of FIGS. 6A-6D is presented for purposes of illustration, and in alternate embodiments, the present invention may utilize steps and sequences other than those step and sequences discussed in conjunction with the embodiment of FIGS. 6A-6D.

Figure 6A:
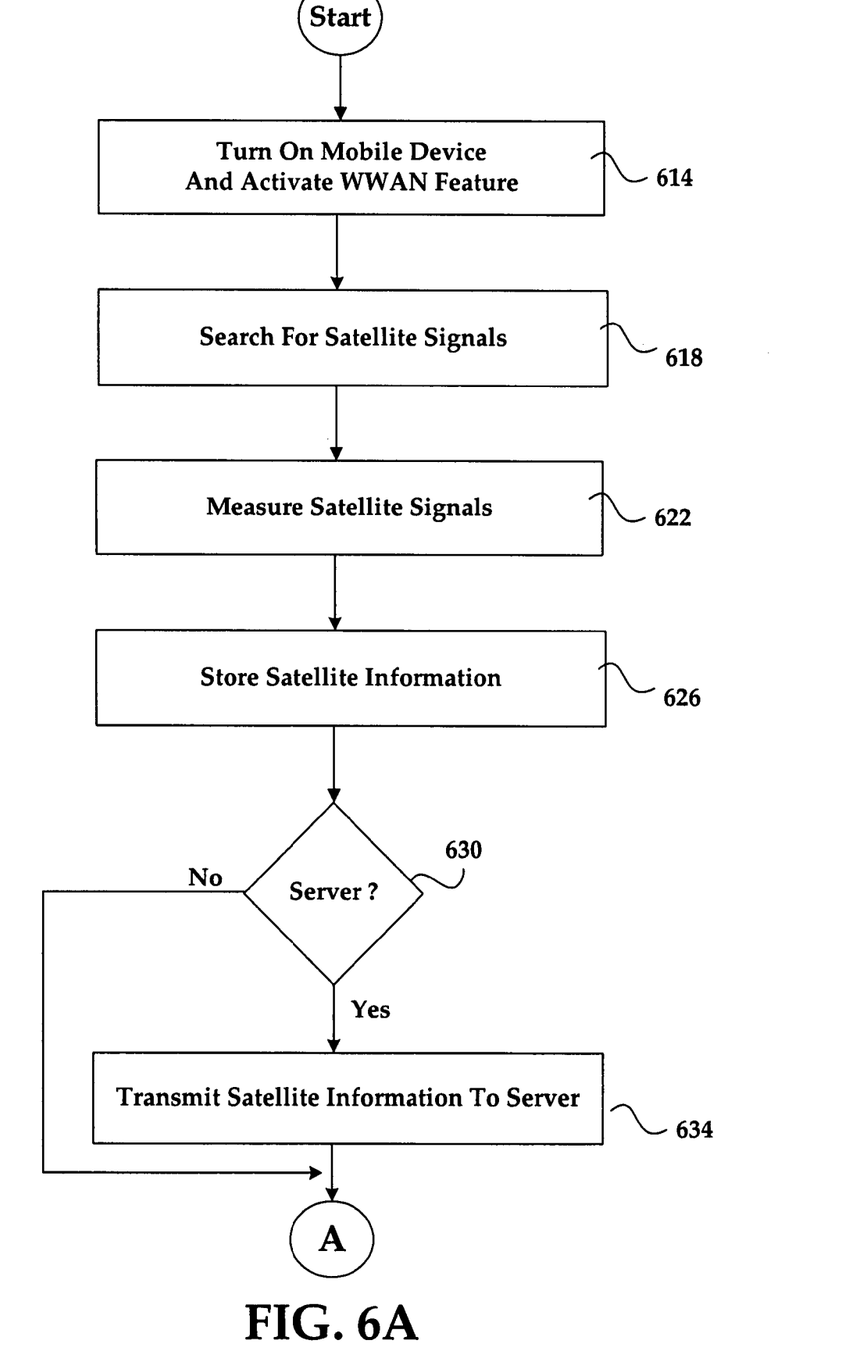
FIGS. 6A-6D present a flowchart of method steps for effectively performing an enhanced mobile-device location procedure, in accordance with one embodiment of the present invention.

In the FIG. 6A embodiment, in step 614, mobile device 114 is initially powered-up, and a satellite reception feature is activated. In addition, the wireless wide-area network (WWAN) functionality of mobile device 114 is also activated. In step 618, a satellite module 420 of mobile device 114 searches for any available satellite beacon signals to identify currently-available satellites 118 (FIG. 1) in electronic network 110. In step 622, satellite module 420 measures each received satellite beacon signal for predefined signal characteristics that may include, but are not limited to, signal strength and signal quality. Satellite module 420 may also determine which of the known satellites 118 are not currently available for any reason.

In step 626, satellite module 420 locally stores all measured data and statistics from the available satellites 130 as satellite information 432 (see FIG. 4). In step 630, a location detector 416 of the mobile device 114 determines whether a location server 126 will be used to perform certain calculations and analyses during the current mobile-device location procedure. If location server 126 will be utilized during the current mobile-device location procedure, then in step 634, mobile device 114 transmits the measured satellite information 432 to location server 126 by utilizing any effective means. For example, mobile device 114 may wirelessly transmit satellite information 432 to location server 126 through base station A 122(a), as shown in FIG. 1. The FIG. 6A process then advances to step 638 of FIG. 6B through connection letter "A."

Figure 6B:
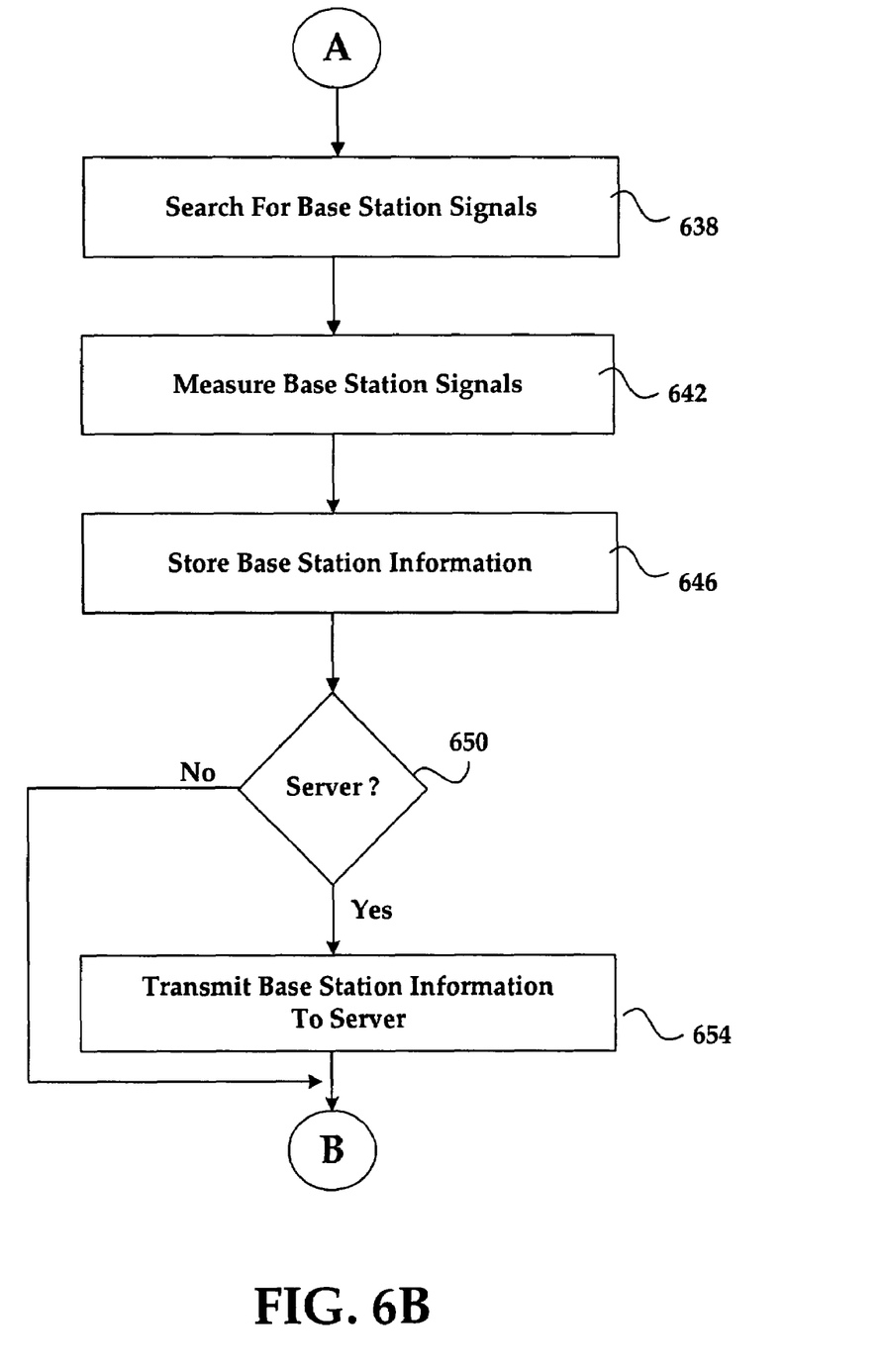

In step 638, a base station module 424 of mobile device 114 searches for any available base-station pilot signals to identify currently-available base stations 122 (FIG. 1) in electronic network 110. In step 642, base station module 424 measures each received base-station beacon signal for predefined signal characteristics that may include, but are not limited to, signal strength and signal quality. Base station module 420 may also determine which of the known base stations 122 are not currently available for any reason.

In step 646, base station module 424 locally stores all measured data and statistics from the available base stations 122 as base station information 436 (see FIG. 4). In step 650, location detector 416 of the mobile device 114 determines whether location server 126 will be used to perform certain calculations and analyses during the current mobile-device location procedure. If location server 126 will be utilized during the current mobile-device location procedure, then in step 654, mobile device 114 transmits the measured base station information 436 to location server 126 by utilizing any effective means. For example, mobile device 114 may wirelessly transmit base station information 436 to location server 126 through base station A 122(a), as shown in FIG. 1. The FIG. 6B process then advances to step 658 of FIG. 6C through connection letter "B."

Figure 6C:
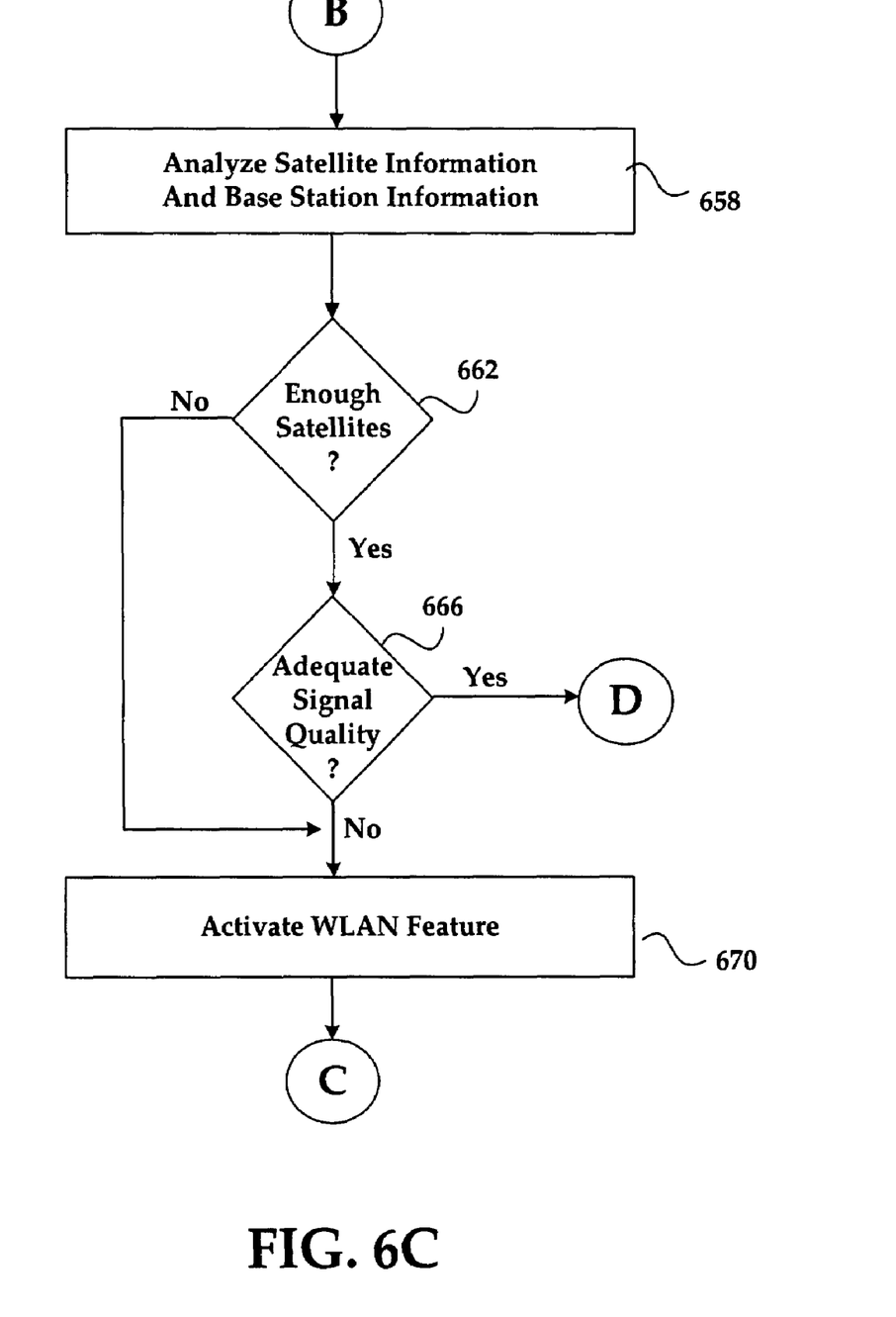

In step 658, location detector 416 of mobile device 114, or any other appropriate entity (such as location server 126), analyzes satellite information 432 and base station information 436. In particular, in step 662, location detector 416 or location server 126 may analyze satellite information 432 to determine how many satellites 118 currently provide valid satellite beacon signals to mobile device 114. Location detector 416 or location server 126 then determines whether there are currently a sufficient number of available satellites 118 to successfully perform an accurate mobile-device location procedure. In certain embodiments, location detector 416 may compare the total number of currently-available satellites 118 with a predefined minimum satellite threshold value.

If there are currently an insufficient number of available satellites 118 to successfully perform an accurate mobile-device location procedure, then the FIG. 6C process advances to step 670. However, if there are currently a sufficient number of available satellites 118 to successfully perform an accurate mobile-device location procedure, then in step 666, location detector 416 or location server 126 may evaluate satellite information 432 and base station information 436 to ensure that a system configuration 518 for successfully performing the current mobile-device location procedure may be formed by utilizing only satellite(s) 118 and base station(s) 122. If signal characteristics (signal strength, signal quality, etc.) of satellite information 432 and base station information 436 are adequate, then the FIG. 6C process may advance to step 694 of FIG. 6D through connection letter "D."

However, if signal characteristics of satellite information 432 and base station information 436 are inadequate, then in step 670 mobile device 114 activates its wireless local-area network (WLAN) functionality. In accordance with the FIG. 6 embodiment, mobile device 114 thus conserves operating power by only activating its WLAN functionalities if needed. In certain other embodiments, the WLAN feature of mobile device 114 may be activated at the beginning of the FIG. 6 procedure, and steps 658, 662, 666, and 670 may be omitted. The FIG. 6C process may then advance to step 674 of FIG. 6D through connection letter "C."

Figure 6D:
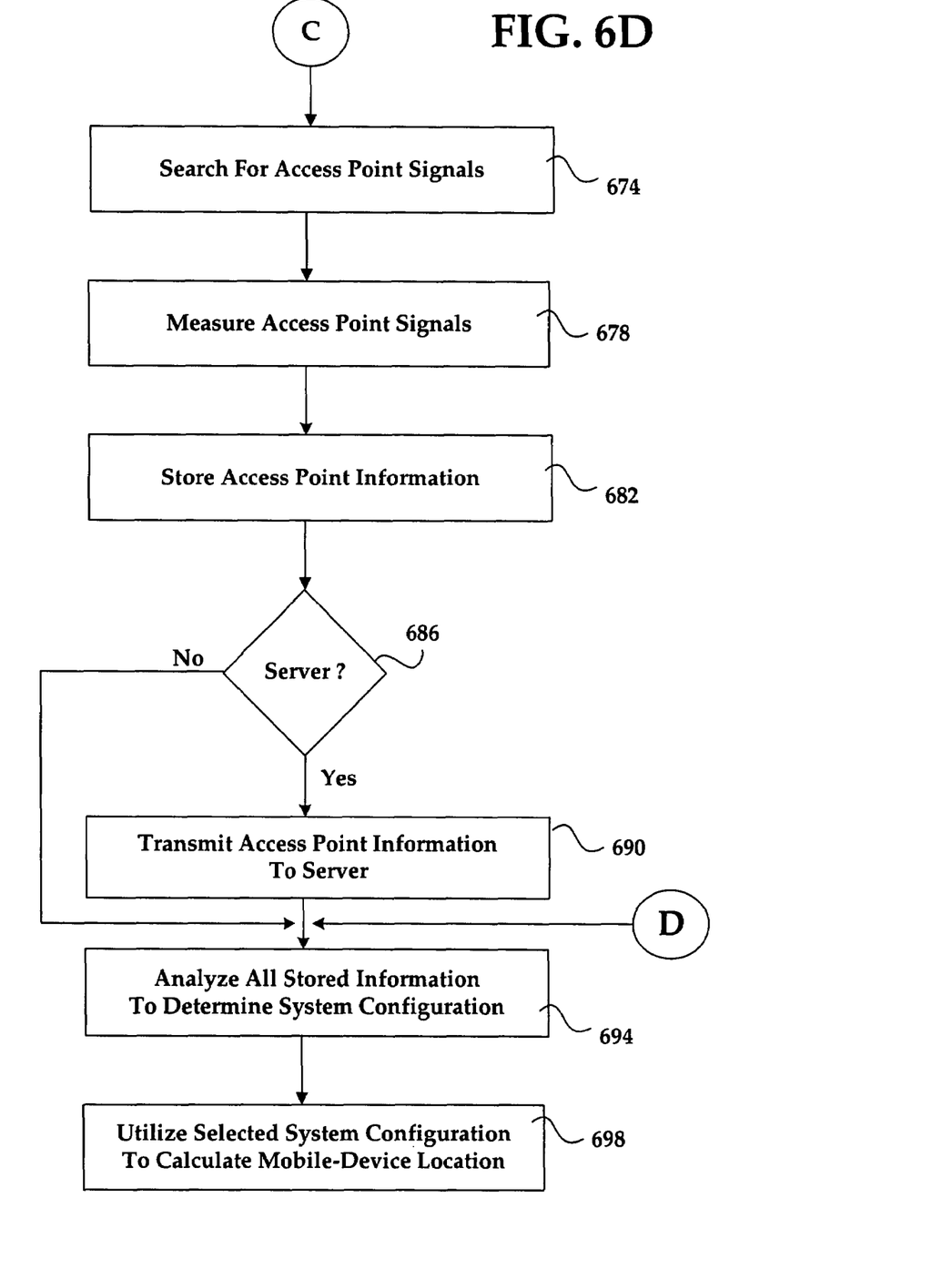

In step 674, an access point module 428 of mobile device 114 searches for any available access-point beacon signals to identify currently-available access points 130 (FIG. 1) in electronic network 110. In step 678, access point module 428 measures each received access-point beacon signal for predefined signal characteristics that may include, but are not limited to, signal strength and signal quality. Access-point module 428 may also determine which of the known access points 130 are not currently available for any reason.

In step 682, access point module 428 locally stores all measured data and statistics from the available access points 130 as access point information 440 (see FIG. 4). In step 686, a location detector 416 of the mobile device 114 determines whether location server 126 will be used to perform certain calculations and analyses during the current mobile-device location procedure. If location server 126 will be utilized during the current mobile-device location procedure, then in step 686, mobile device 114 transmits the measured access point information 440 to location server 126 by utilizing any effective means. For example, mobile device 114 may transmit access point information 440 to location server 126 through base station A 122(*a*), as shown in FIG. 1.

In step 694, location detector 416 or another appropriate entity (such as location server 126) performs a system-configuration analysis procedure on all stored information (satellite information 432, base station information 436, and access point information 440) to determine an optimal system configuration 518 (FIG. 5) for performing the current mobile-device location procedure, as discussed above in conjunction with FIG. 5. Finally, in step 698, location detector 416 may utilize the selected system configuration 518 for accurately performing the mobile-device location procedure. The present invention thus provides an improved system and method for effectively performing enhanced mobile-device location procedures.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a device location procedure, comprising:
   a plurality of electronic devices that wirelessly transmit device location signals, said plurality of electronic devices including satellites that transmit satellite beacon signals and base stations that transmit pilot signals;
   a plurality of access points that wirelessly transmit access-point beacon signals;
   a location detector that coordinates said device location procedure by measuring said device location signals and said access-point beacon signals to determine a current physical location of a mobile device, said location detector generating satellite information by measuring said satellite beacon signals, base station information by measuring said pilot signals, and access point information by measuring said access-point beacon signals, said satellite information, said base station information, and said access point information including signal strength measurements and signal quality measurements, said location detector analyzing said satellite information, said base station information, and said access point information to select an optimal system configuration from certain of said satellites, said base stations, and said access points, said location detector then utilizing said optimal system configuration to determine said current physical location of said mobile device.

2. The system of claim 1 wherein said location detector chooses said optimal system configuration from a group of predefined system configurations that include a first configuration with only said satellites, a second configuration with any combination of said satellites and said base stations, a third configuration with any combination of said base stations and said access points, a fourth configuration with only said access points, and a fifth configuration with any combination of said satellites, said base stations, and said access points.

3. The system of claim 1 wherein said location detector selects said optimal system configuration based upon predefined selection criteria that include signal transmission availabilities, assigned configuration priority values, and signal evaluation scores.

4. A system for performing a device location procedure, comprising:
   a plurality of electronic devices that wirelessly transmit device location signals, said plurality of electronic devices including satellites that transmit satellite beacon signals and base stations that transmit pilot signals;
   a plurality of access points that wirelessly transmit access-point beacon signals;
   a location detector that coordinates said device location procedure by measuring said device location signals and said access-point beacon signals to determine a current physical location of a mobile device, said location detector activating a WLAN feature to detect said access-point beacon signals only if said device location procedure can not be accurately performed with said satellite beacon signals and said pilot signals.

5. The system of claim 4 wherein said location detector activates said WLAN feature if an available number of said satellites is less than a predefined minimum satellite threshold value, and if an insufficient number of said pilot signals and said satellite beacon signals have measured signal qualities that are above a predefined minimum signal-quality threshold value.

6. A method for performing a device location procedure, comprising the steps of:
   transmitting device location signals wirelessly from a plurality of electronic devices, said plurality of electronic devices including satellites that transmit satellite beacon signals and base stations that transmit pilot signals;
   emitting access-point beacon signals wirelessly from a plurality of access points;
   utilizing a location detector to coordinate said device location procedure, said location detector measuring said device location signals and said access-point beacon signals to determine a current physical location of a mobile device, said location detector generating satellite information by measuring said satellite beacon signals, base station information by measuring said pilot signals, and access point information by measuring said access-point beacon signals, said satellite information, said base station information, and said access point information including signal strength measurements and signal quality measurements, said location detector analyzing said satellite information, said base station information, and said access point information to select an optimal system configuration from certain of said satellites, said base stations, and said access points, said location detector then utilizing said optimal system configuration to determine said current physical location of said mobile device.

7. The method of claim 6 wherein said location detector chooses said optimal system configuration from a group of predefined system configurations that include a first configuration with only said satellites, a second configuration with any combination of said satellites and said base stations, a third configuration with any combination of said base stations and said access points, a fourth configuration with only said access points, and a fifth configuration with any combination of said satellites, said base stations, and said access points.

8. The method of claim 6 wherein said location detector selects said optimal system configuration based upon predefined selection criteria that include signal transmission availabilities, assigned configuration priority values, and signal evaluation scores.

9. A method for performing a device location procedure, comprising the steps of:
transmitting device location signals wirelessly from a plurality of electronic devices, said plurality of electronic devices including satellites that transmit satellite beacon signals and base stations that transmit pilot signals;
emitting access-point beacon signals wirelessly from a plurality of access points;
utilizing a location detector to coordinate said device location procedure, said location detector measuring said device location signals and said access-point beacon signals to determine a current physical location of a mobile device, said location detector activating a WLAN feature to detect said access-point beacon signals only if said device location procedure can not be accurately performed with said satellite beacon signals and said pilot signals.

10. The method of claim 9 wherein, said location detector activates said WLAN feature if an available number of said satellites is less than a predefined minimum satellite threshold value, and if an insufficient number of said pilot signals and said satellite beacon signals have measured signal qualities that are above a predefined minimum signal-quality threshold value.

11. A system for performing a device location procedure for a mobile device, comprising:
a plurality of satellites that wirelessly transmit satellite beacon signals;
a plurality of base stations that wirelessly transmit pilot signals;
a plurality of access points that wirelessly transmit access-point beacon signals;
a location detector that coordinates said device location procedure by measuring said satellite beacon signals, said pilot signals, and said access-point beacon signals to generate satellite information, base station information, and access point information, said location detector analyzing said satellite information, said base station information, and said access point information to select an optimal system configuration from certain of said satellites, said base stations, and said access points, said location detector then utilizing said optimal system configuration to determine a current physical location of said mobile device.

* * * * *